March 21, 1961 G. R. JEWELL 2,975,696
MOTOR VEHICLE VENTILATION SYSTEM
Filed June 5, 1957 2 Sheets-Sheet 1
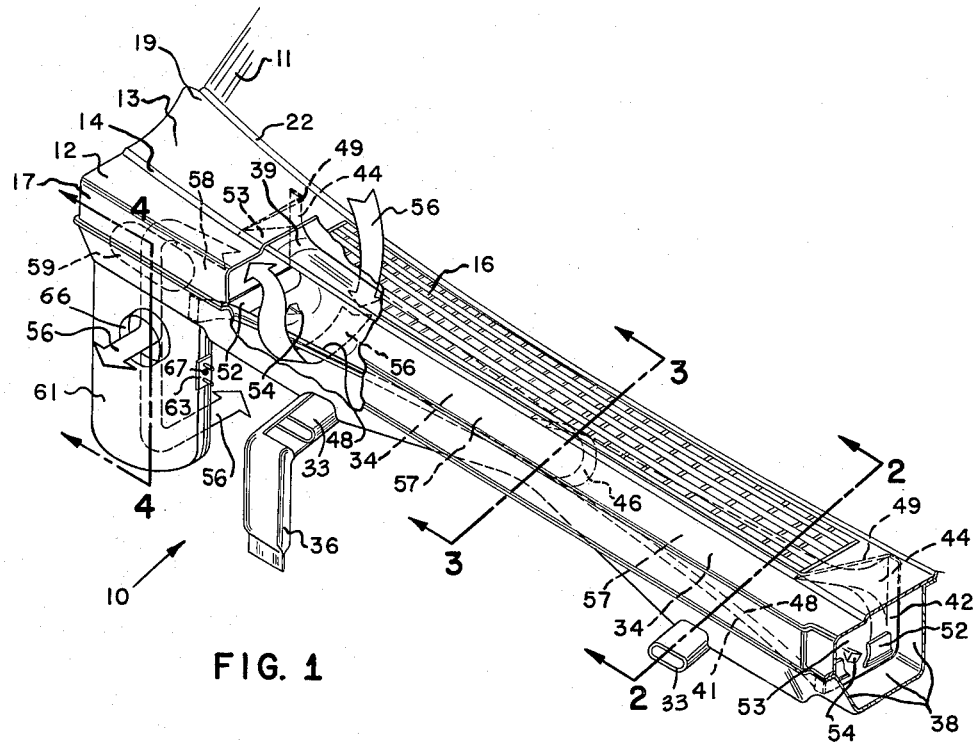
FIG. 1
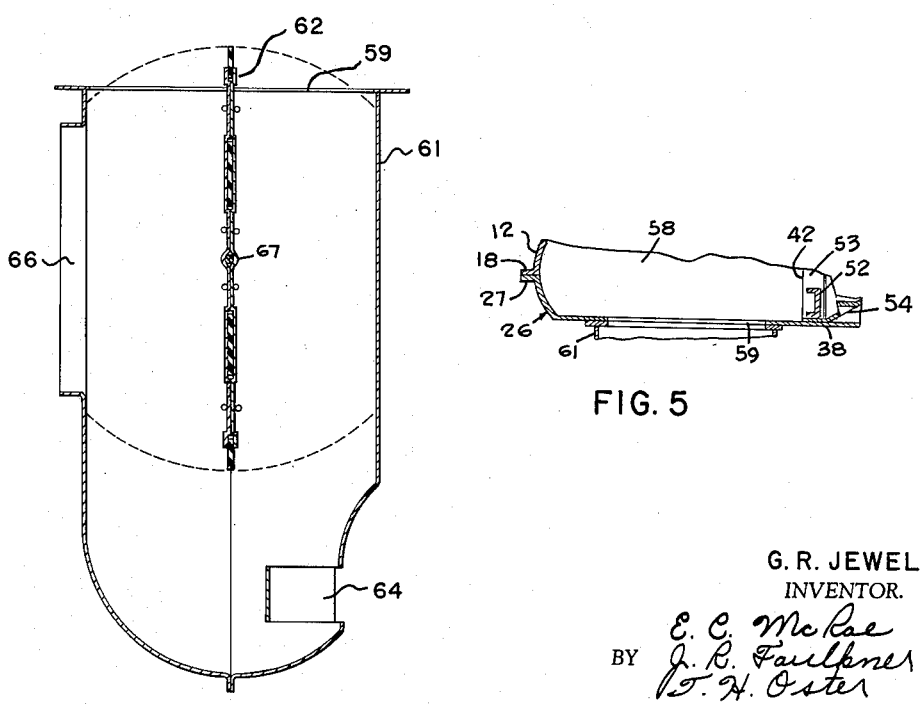
FIG. 4
FIG. 5
G. R. JEWELL
INVENTOR.
BY E. C. McRae
J. R. Faulkner
T. H. Oster
ATTORNEYS March 21, 1961 G. R. JEWELL 2,975,696
MOTOR VEHICLE VENTILATION SYSTEM
Filed June 5, 1957 2 Sheets-Sheet 2

G.R. JEWELL
INVENTOR.

BY E. C. McRae
J. B. Faulkner
T. H. Oster

ATTORNEYS

United States Patent Office 2,975,696
Patented Mar. 21, 1961

2,975,696
MOTOR VEHICLE VENTILATION SYSTEM

Gordon R. Jewell, Plymouth, Mich., assignor to Ford Motor Company, Dearborn, Mich., a corporation of Delaware Filed June 5, 1957, Ser. No. 663,812

4 Claims. (Cl. 98—2)

This invention relates generally to motor vehicles and particularly to a novel passenger compartment ventilation system.

The present invention incorporates a transverse opening in the cowl top, immediately forward of the windshield of the vehicle, which opens into a unique scroll-like chamber directly below the opening. This chamber is so designed in shape and size to create a natural flow of air from the smaller section at the center of the car to the larger section at the outlet ends of the chamber, where it is discharged into the passenger compartment.

When the vehicle is in motion, an increased or high pressure area exists over the cowl opening resulting in a mass of air moving downward through the opening into the scroll-like chamber. Due to the decreasing radial section of the air passage and the increasing total size of the chamber as it extends outward from the center of the cowl, a natural flow of air is obtained around the scroll outward to the discharge openings at the ends. Because of this configuration, air is moved continually in a spiral fashion with a minimum of impedance. The centrifugal action of the movement of air deposits any moisture, which is in the incoming air, onto the surfaces of the chamber where it is subsequently drained outside the passenger compartment.

Further modifications may be incorporated to prevent the entrance of moisture into the passenger compartment such as by baffling the discharge opening at the bottom or around its peripheral edge. Moisture which has managed to enter the inner air shield is drained through the shield and onto the surface of the chamber and subsequently drained outside the passenger compartment through an appropriate aperture.

Other objects and advantages of this invention will be made more apparent as this description proceeds, particularly when considered in connection with the accompanying drawings wherein:

Figure 1 is a perspective view partly in section of a cowl type ventilator embodying the present invention;

Figure 4 is an enlarged vertical cross-sectional view taken of the passenger vent on the plane indicated by the line 4—4 of Figure 1; and, Figure 5 is a partial, enlarged, vertical, cross-sectional view taken through the left end of the cowl type ventilator as seen in Fig. 1 looking toward the passenger compartment.

Figure 3:
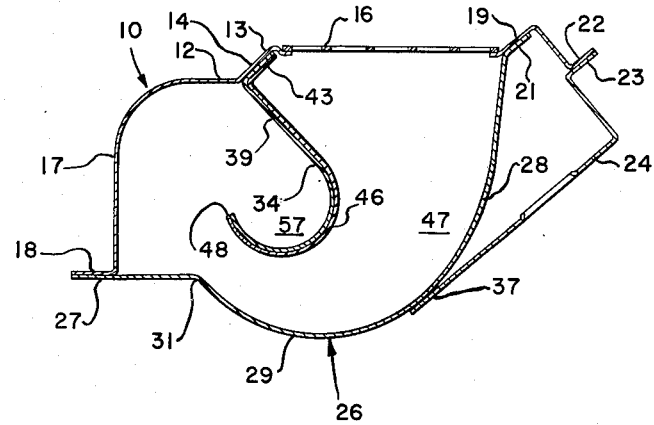
Figure 3 is an enlarged cross-sectional view taken on the plane indicated by the line 3—3 of Figure 1.

Referring now to the drawings, the cowl area of a motor vehicle and the like is indicated generally at 10 which is located forwardly of the curved windshield 11 shown in part. A top panel 12 extends substantially the length of the front of the vehicle and has a generally raised horizontal section 13 adjacent the front of the windshield. A grille section 16 is secured to the raised section 13 centrally of the windshield which permits air to pass through the top panel 12. Although not shown, a screen may be desirable over the grille opening to prevent the entrance of insects and rubbish.

Forward of the raised section 13, the top panel is formed with an arcuate downwardly extending face 17 terminating in forward attachment flange 18. Rearwardly of the raised horizontal section 13, the top panel is angled upwardly to form an attachment flange 19 for the inner panel flange 21 and then extended rearwardly to terminate in an attachment flange 22 for the flange 23 of the windshield reinforcement bracket 24.

A transversely extending inner panel 26 is weldably secured to the top panel flanges 18 and 19 by its flanges 21 and 27. Flanges 18, 19 and 21, 27 extend around the outer ends of the top panel 12 and inner panel 26 to form a completely closed box-like structure. Inner panel 26 is formed with a depending arcuate rear and bottom sections 28 and 29 respectively and a forward section 31 which is inwardly tapered toward the center to form a generally scroll-like interior inner panel smaller in the center and larger as it approaches the outlet ends. An outwardly flared and downwardly angled drain aperture 32 is located on each outer end of the inner panel 26 in the forward section 31 adjacent the bottom section 29 to which is weldably secured a nozzle 33. A flexible short tube 36 is mounted to the nozzle 33 and permits water to be drained through the engine compartment without the emission of noise or other undesirable sounds. This commercially available tube (only one of which is shown) is pinched at its lower end. When a sufficient weight of water has collected in the tube, the pinched end of the tube is forced apart by the weight of the water allowing the water to drain out. The structural soundness and attachment of the inner panel 26 and the top panel 12 is assured by welding a varying cross-section windshield reinforcement 24 through flanges 23 and 37 to flange 19 and section 28 respectively.

At its outer ends, the sections 28, 29, and 31 respectively of the inner panel 26 are formed into a box-like section indicated generally at 38. A pair of symmetrically opposite scroll-like air guides 39 and 41 are provided joined at their inner ends and having a base section 42 weldably secured to the section 38, and a securing flange 43 welded to the angled side 14 of the raised cowl section 13.

Figure 2:
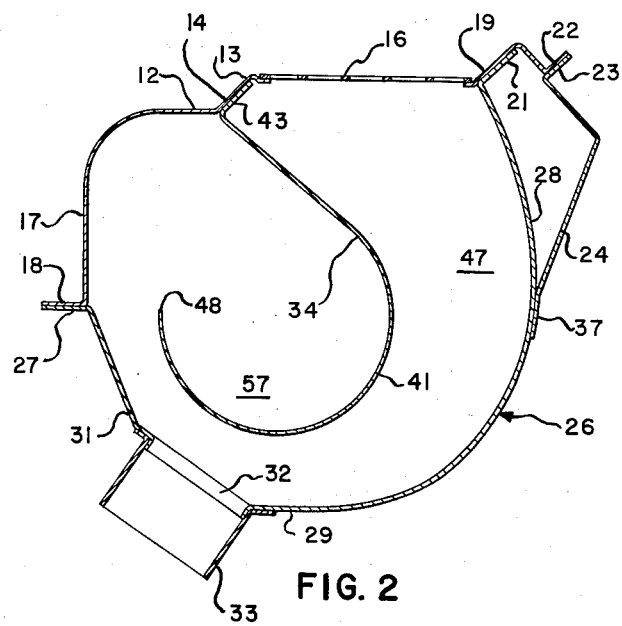
Figure 2 is an enlarged cross-sectional view taken on the plane indicated by the line 2—2 of Figure 1.

The air guides 39 and 41 have a scroll-like body 34 in appearance and have the large spiral portion near the base 42 which decreases in diameter as it approaches its inner end and/or the centerline of the vehicle. As can be seen in Figures 2 and 3, the relationship between the air guides and the cowl inner panel sections is one of a constantly decreasing radial section causing the air to increase in velocity as it moves through chamber 47 into the air guide region 57. The volume of the chamber 47 and the guide region 57 increases from the inner end, that is, the centerline of the vehicle, outwardly to the respective outlets in the ends. Because of the increased size of the chamber area 47 from the inner end to the outlets in the ends, an ever increasing volume of air passes between the cowl inner panel forward section 31 and the guide edges 48 imparting greater velocity to the air as it enters the progressively increasing guide region 57 which in turn results in the imparting of a higher velocity to the air in the direction of the outlets. The air guide region adjacent the base 42 is formed inwardly to provide an arcuate section 44 having a flange 49 which may be welded to the underside of the raised section 13 by continuing the flange 43 around the section 44. Air guides 39 and 41 extend toward each other with the scroll becoming smaller as it approaches the longitudinal center of the cowl. At this central point, the air guide 41 overlaps the edge of guide 39 by flange 46 which is weldably secured to the guide 39. After the guides 39 and 41 have been weldably secured in place, the air is confined to the central scroll-like chamber 47. As can be seen from the drawings, the guides 39 and 41 are not closed but have an inner edge 48 which extends beyond the lowermost part of the guide.

In areas where excessive moisture conditions are encountered, an upstanding water baffle plate 52 may be weldably secured to the sections 38 and 42 to cover the lower part of guide openings 53. Because of the shape of the guides which has its central portion higher than its outer ends, water in the guide would naturally drain in the direction of the base 42. Adjacent to the baffle 52, a pierced arrow-shaped drain hole 54 is provided in the guides 39 and 41 allowing water in the guides to drain through the opening 54 back into the chamber 47 and out through nozzle 33. Other means of baffling the openings 53 are possible such as by decreasing the size of the openings 53 with respect to air guides, thus forming a baffle along the peripheral edge of the opening.

It can thus be seen that pressured air indicated by the arrows 56 goes through the grille 16 into the scroll-like air chamber 47 and circulates around the guide body 34 to enter the guide region 57 and spirals outwardly until it goes through the openings 53 at the outer ends of the guides. Entrapped moisture or water is thrown out by the centrifugal action of the spiraling and would normally drain through the nozzle 32 at either side of the cowl into the atmosphere. Should the water manage to circulate about the guide edges 48 and enter the guide region 57, it would be stopped by the baffle 52 or an equivalent structure and would drain from the guide region 57 through the drain aperture 54 into the chamber 47 and through nozzle 33.

Air going through the guide openings 53 is directed into a chamber 58 on the outer side of the baffle and defined by the top panel 12 and inner panel 26 of which only one is shown complete. An enlarged aperture 59 permits the air to enter the air inlet vent 61 (of which only one is shown). A damper valve 62 of conventional construction is pivotally mounted upon shaft 67 which is journaled in the sides of vent 61. A control plate 63 is connected to the shaft 67 outside of the vent 61. Pivotal movement of the valve 62 is obtained by connecting conventional Bowden cables (not shown) to control plate 63 and moving these cables to position the valve 62 to permit air to be exhausted through aperture 64 into the passenger compartment or into the heater and air conditioning conduits through aperture 66, or a combination of both.

It will be understood that the invention is not to be limited to the exact construction shown and described, but that various changes and modifications may be made without departing from the spirit and scope of the invention, as defined in the appended claims.

What is claimed is:

1. A cowl providing a ventilation system for a motor vehicle having a passenger compartment and a windshield forwardly of the passenger compartment, a cowl top extending transversely of the vehicle and forwardly of the windshield, an air intake opening in the cowl top for the passage of air, an inner panel member having flange portions completely secured to the underside of said cowl top, said cowl top and said inner panel member forming a transverse hollow shell, said inner panel member forming the under side of a transversely extending air passage in said shell, an air opening at each end of the shell laterally outwardly of the vehicle centerline and communicating with the passenger compartment, a curved air guide member mounted beneath said cowl top and depending downwardly into the shell in spaced apart relationship to said inner panel member, said air guide member forming the inner side of the transversely extending air passage, one of said members having a relatively small curved section centrally of the cowl and a progressively larger curved outer section extending laterally outwardly on opposite sides of said small section, the laterally outward ends of said air guide member being secured to the inside of the cowl top and the inner panel member intermediate of said air openings communicating with the passenger compartment thereby damming the inlet air and compelling it to flow around and into the air guide before passing through the air openings communicating with the passenger compartment, and drainage means in said inner panel member open to the air passage.

2. A cowl providing a ventilation system for a vehicle having a passenger compartment and a windshield forwardly of the passenger compartment, said cowl comprising a top panel extending transversely of the vehicle and forwardly of the windshield, an air intake opening in the top panel for the passage of air, an inner panel having flange portions completely secured to the underside of the top panel, said inner panel having a narrow portion centrally of the cowl and progressively expanding scroll-like outer sections extending laterally outwardly in opposite directions of the narrow portion to form with the top panel in part a terminal box defining an air chamber having an opening communicating with the passenger compartment, a pair of curved transverse air guides defining an air guide region secured to the underside of the top panel, each of said air guides having a narrow section centrally of the cowl and a progressively expanding curved outer portion extending laterally of and in opposite directions from said narrow section and terminating in a base section, means for securing each of said base sections to the inside of the top panel and the inner panel adjacent to the air chambers so that the air guide region communicates with the air chambers and forces the inlet air to flow around and into the air guides, and additional means for securing said air guides to each other at their respective narrow sections, said air guides and said inner panel being disposed in spaced apart relationship and providing an air passage therebetween connecting the air intake opening, the air chambers and the passenger compartment whereby air is received through the air intake passes between the air guides and the inner panel and around the air guides into the air guide region and from there through the air chamber and through the opening in the air chamber into the passenger compartment.

3. In a motor vehicle having a passenger compartment, a windshield forwardly of said compartment, an improved cowl ventilation system providing a cowl comprising a pressed cowl top disposed adjacent to and forwardly of the windshield, air intake means including a grille positioned centrally of said cowl top, a transversely disposed pressed inner cowl panel having flange portions completely secured to the cowl top and extending beneath said cowl top, said inner cowl panel having a relatively small arcuate portion centrally of the cowl and a progressively larger arcuate end portion laterally of and on each side of said small arcuate portion and expanding to form in part with the cowl top a terminal box defining an air chamber, an air guide extending laterally outwardly from each side of the small arcuate portion of the inner cowl panel and concentrically within the cowl, each of said air guides having a small arcuate end section centrally of the cowl and a progressively larger outer arcuate section extending laterally on each side of said air guide small arcuate portion and terminating in a base section adjacent to the air chamber, a pair of openings in the inner cowl panel communicating with the passenger compartment and the air chambers, first attachment means for securing said air guides to the cowl top, second attachment means connecting said guides to each other at their small arcuate end section, and their attachment means securing each base section to the cowl top and the inner cowl panel to completely form the terminal boxes defining the air chambers, said air guides and said inner cowl panel being disposed in spaced apart relationship and forming a spiraled air passage chamber smaller centrally of the vehicle and progressively larger near the air chambers, said attachment of said base section to said cowl top and inner cowl panel effectively damming the inlet air and forcing the air to flow around and into the air guides before passing into the air chambers and out through the openings in the inner cowl panel communicating with the passenger compartment, and a drain aperture in the inner cowl panel.

4. The structure defined by claim 3 which is further characterized in that a baffle is provided which is secured to the lowermost portion of the base section of each air guide to prevent moisture collected on the air guides from passing into the air chambers and out through the openings communicating with the passenger compartment, an aperture in said air guides adjacent said baffle and communicating with the spiraled air passage chamber permitting moisture in the air guide to drain into the spiraled air passage chamber and subsequently pass through the drain aperture in the inner cowl panel into the atmosphere.

References Cited in the file of this patent

UNITED STATES PATENTS

| | | |
|---|---|---|
| 1,643,966 | Swartwout | Oct. 4, 1927 |
| 2,476,368 | Guernsey | July 19, 1949 |
| 2,807,201 | Leslie et al. | Sept. 24, 1957 |

FOREIGN PATENTS

| | | |
|---|---|---|
| 568,146 | France | Mar. 17, 1924 |